United States Patent
Oliveira

(10) Patent No.: US 8,804,541 B2
(45) Date of Patent: Aug. 12, 2014

(54) METHOD FOR MANAGING MOBILE RADIO RESOURCES FOR PACKAGE RECEIVING ENHANCEMENT

(75) Inventor: Tito Ricardo Bianchin Oliveira, Campinas (BR)

(73) Assignee: Samsung Eletrônica da Amazônia Ltda., Manaus (BR)

( * ) Notice: Subject to any disclaimer, the term of this patent is extended or adjusted under 35 U.S.C. 154(b) by 105 days.

(21) Appl. No.: 13/278,495

(22) Filed: Oct. 21, 2011

(65) Prior Publication Data

US 2013/0100827 A1  Apr. 25, 2013

(51) Int. Cl.
*H04L 12/26* (2006.01)
*H04W 24/00* (2009.01)

(52) U.S. Cl.
CPC ............... *H04W 24/00* (2013.01); *H04L 12/26* (2013.01)
USPC ........................................................ 370/248

(58) Field of Classification Search
CPC .................................................. H04W 24/00
USPC ........................................................ 370/248
See application file for complete search history.

(56) References Cited

U.S. PATENT DOCUMENTS

| 2010/0118752 A1* | 5/2010 | Suzuki et al. | 370/311 |
| 2011/0207465 A1* | 8/2011 | Dwyer et al. | 455/450 |
| 2012/0106506 A1* | 5/2012 | Taaghol | 370/331 |

* cited by examiner

*Primary Examiner* — Dang Ton
*Assistant Examiner* — Nourali Mansoury

(57) ABSTRACT

A method for managing mobile radio resources for package receiving enhancement includes a mobile device that begins monitoring a buffer once the mobile device is in a radio resource control (RRC) connected state. While monitoring, the mobile device checks the state of stacking data packets and the rate at which data packets are being received. An arrival profile for data packets as a function of time is created with this data. A traffic prediction operation is carried out based on the arrival profile. The buffer is checked to determine whether it is empty and whether the predicted traffic is zero. If both conditions are positive, an interrupt signal is sent to a specific point of the RRC state machine requesting that the normal flow be diverted, a disconnection signal from the mobile device is generated, and the mobile device enters an idle mode.

11 Claims, 7 Drawing Sheets

METHOD FOR MANAGING MOBILE RADIO RESOURCES FOR PACKAGE RECEIVING ENHANCEMENT

FIELD OF INVENTION

The present invention relates to communication networks having mobile wireless terminals. In particular, the present invention relates to management of power consumption of mobile wireless devices, like mobile phone, PDAs and smartphones having an active data communication connection based on 3G technology.

BACKGROUND OF INVENTION

The expansion of the third generation (3G) networks around the world and the increase in bandwidth for data transmission increased the offer of new services. The new data services and the Internet access using the mobile devices made 3G networks to be integrated with other networks for data communication.

Data and mobile networks are becoming seamless and the information traffic is increasing due to the broad, and increasing, bandwidth available. The air interface resources required for data traffic makes the energy consumption to increase, reducing the battery lifetime from the 3G mobile devices. The impact to exchange messages to allocate physical resources from mobile devices and the network in a third generation network is higher than in a second generation network due to the air interface channels characteristics and the protocol structures.

In fact, some of the most popular smartphone applications are also some of the greatest generators of signaling traffic. Social networking applications, in which friends are connected with each other for extended periods of time, inherently involve frequent back and forth messages or status updates. Instant messaging services, VOIP applications, and other popular services, are just some of the examples while if someone is "connected" it would not be uncommon for him to simultaneously leverage multiple social networking applications.

One of the concepts used for mobile devices is Always-On. This is used for mobile devices that need to be reached by other devices or service and it remains connected to the network with a valid network address. Applications like e-mails, which use e-mail push and VoIP, are examples of services which require the mobile device to be reached anytime by the access network.

Another important aspect to be considered is the radio resource allocation, which is dynamically performed according to the data traffic. The Radio Resource Control (RRC) has two states in 3G networks: Idle and Connected. When a device is connected to the network, it is generally consuming at least some network resources, while transitioning between the various RRC states can generate a little or a lot of signaling traffic. The RRC state has an impact on the battery life with some states requiring considerably more current consumption than other states.

The idle state is the mode in which the mobile device is basically dormant and not communicating with the network, although it does listen certain broadcast messages. In this state, the radio portion of the phone is not consuming any network resources and it consumes the least amount of power, or in the range of only 5 mA. The connected stated is divided into the following modes: Cell Dedicated Channel (Cell_DCH), Cell Forward Access Channel (Cell_FACH) and Cell Paging Channel (Cell_PCH). Said states indicate various levels of being connected to the network, even though the definition of being connected varies widely between the three states, as follows:

Cell_DCH is the state, in which a dedicated channel is allocated to the mobile device. It is used for data transmission when the data amount to be transferred is high. When a mobile phone is in this state, it is consuming the most network resources, while the drain on the battery is also at its highest level, about 200 mA or higher.

Cell_FACH is the common channel used when there is a low volume of data to be transmitted, or the data flow reaches a threshold set by the core network. The energy consumption of mobile devices in this case is about 100 mA.

Cell_PCH is an optional state, in which the phone can receive a network paging signal to check if there are packets to be transmitted through the downlink. The energy consumption in this state is about 1% or 2% of the Cell_DCH mode.

Another aspect to be considered is the transition criteria. One state transition criteria is based on the Buffer Occupation (BO) level of the mobile device. The BO stores the data to be sent, and indicates the traffic flow of data packets. The measurement of the BO is sent from the mobile device to the network, that decides to change RRC state or not. If a reconfiguration is necessary, the message is sent from the network to the mobile device. This message contains the RRC State Indicator field, which is meant to inform which is the new state that the mobile device must switch to.

Another mechanism used to trigger state transition is the timeout due to inactivity periods of time. There are three inactivity timers that are used to determine when a handset or smartphone should move to a lower state following a specified period of time of inactivity.

FIG. 1 shows the characteristic curve for receiving a simple packet. T1 timer refers to the period of time of inactivity within the Cell_DCH state before the 3G device is sent to a lower state. T2 timer is associated with the Cell_FACH state and it is used in a similar manner for determining how long the 3G device should remain in the Cell_FACH state without any activity. Finally, T3 timer determines how long the handset should remain in Cell_PCH before returning to the idle state. The average current for each state is presented in FIG. 2.

Timeouts and resources consumption is another important aspect to be considered. It is simple to show that the bigger the T2 timer is, more energy is consumed by the mobile device. On the other hand, the shorter the timeout value is, more resources from the core network will be spent to perform new connections.

In real networks, the carriers setup the T2 timeout with very large values that can reach up to 30 or 50 seconds. With this strategy, the carrier keeps connection active to prevent reconnections if subsequent packets are received in a short interval (multiple signaling), and save resources from new connections Considering such scenarios, it is possible to find trade-off values, in which the time-outs makes that no unnecessary energy is consumed from the mobile device and therefore no further resources of the network is compromised.

The U.S. Pat. No. 6,807,159 filed on Oct. 25, 2000 discloses a system, method, and computer program product for carrying out the method for managing power consumption in a master driven time division duplex wireless network comprising optimizing power consumption while maintaining quality of service requirements for end-to-end packet delay by adjusting the polling interval for each slave in low power mode based on the incoming traffic at the slave. According to said document, when no packet is being received, the system switches from active to stand-by mode. Also, prediction method for arrival of packets is used, as well as the device is maintained in stand-by mode when there is no traffic being received or sent. The main constrain imposed by the teachings of said document is that a fixed algorithm for traffic prediction is used, which represent a huge prior art drawback.

The U.S. Pat. No. 7,155,261 filed on May 1, 2003 describes a method of saving power in a mobile device during a cell updating procedure in a wireless communication system. The mobile device uses a first timer and a second timer to monitor its internal operations. If only one timer is running, a running timer is assigned to be the first timer. If both timers have no associated Radio Access Bearers (RABs), the first timer is started. Therefore, said document proposes a better check for timeouts, causing the device to leave the CELL_DCH state and going into the idle state, thereby saving power. Differently, the present invention relates to receiving data (IP packets), whereas said US document is linked to the process of selection/re-selection a cell. Also, the involved timeouts are different. The present invention employs T1, T2 and T3, which are used for disconnections of the RRC state machine at the network core side during the "change state" process, whereas according to said US document, T314 and T315 are also timers of RCCRRC state machine but the energy saving method of this document focus the "cell update" process. The present invention comprises a dynamic process for interrupting the timer and disconnect the device, whereas said US document checks the ideal conditions for initializing the timer during the selection/re-selection process.

According the embodiments of such document, an enhanced check of the timers is carried out, causing the device to leave the CELL_DCH state to the IDLE state, saving power. Said document deals with cell selection/reselection, whereas the present invention relates to data receiving (IP packets).

The US document US 20090285142 filed on Apr. 5, 2009 discloses a system and method for maximizing the standby time of mobile communication devices that have Wi-Fi or other high energy-consuming network interfaces, by predicting in real time actionable silent periods of time (ASPs) of the interface and shutting the interface down during these ASPs. Standby times are significantly increased, resulting in longer periods of time of operation before battery charging is required, while keeping minimal the probabilities of missing incoming data packets when the interface is turned off. The method of reducing energy consumption of a device that operates intermittently with extended periods of time of inactivity between intermittent operations, comprising the steps of: monitoring operation of said device to detect periods of time of inactivity; predicting the duration of a detected period of time of inactivity; and turning off power to said device for a period of time substantially corresponding to said predicted duration. According to the teachings of said document, prediction model is used for silence intervals. Also, there is no change in the protocols, but in the ON/OFF periods of time for transmission and reception. In addition, the energy consumption is controlled by the mobile device, with no interference of the network. Nonetheless, when using such teachings, packets may be lost. In addition, separate receivers are required, which may pose extra problems for implementation.

SUMMARY OF THE INVENTION

The present invention comprises a method for reducing energy consumption in 3G mobile devices by managing power consumption of mobile wireless devices, like mobile phone, PDAs and smartphones having an active data communication connection based on 3G technology.

In the present invention, the main concept is to reduce the time the mobile wait before it stops listening to the cell forward access channel (CELL_FACH) and moving to the idle state. This reduces the inactivity period of time of the channel transmission when no data is being received, but the resources of network air interface are still available. This solution has been shown to be efficient for reducing energy consumption in about 20%, according to present tests.

The present invention proposes a method to generate the best timeouts based on different traffic profiles for incoming and outgoing data on mobile devices. Provided that the timeout times are defined by the network, the present method makes use of the ability of the mobile device to generate signals to perform the disconnection according to rules of the 3GPP standard.

BRIEF DESCRIPTION OF FIGURES

The objects and advantages of the present invention will become apparent from the following detailed description of an exemplary embodiment of the invention and attached drawings by way of non-limiting example, in which.

DESCRIPTION OF PREFERRED
EMBODIMENTS OF THE INVENTION

Example embodiments will now be described more fully with reference to the FIGS. 3 until 8.

Figure 1:
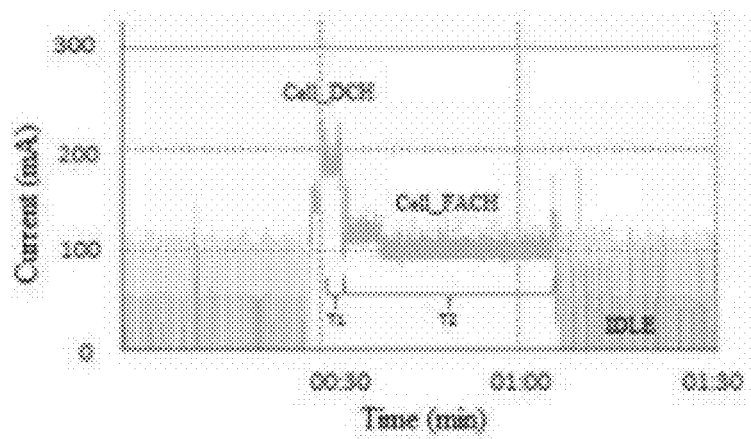
FIG. 1 shows a graphic depicting a characteristic curve for receiving a simple packet according to the prior art.
Figure 2:
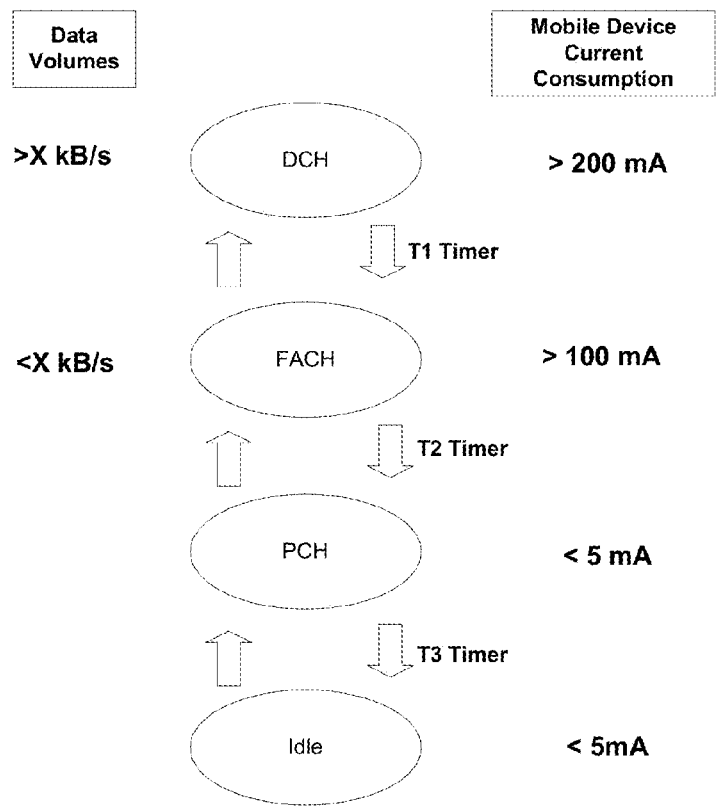
FIG. 2 shows the relationship on traffic flow, current consumption and RRC states according the prior art.
Figure 3:
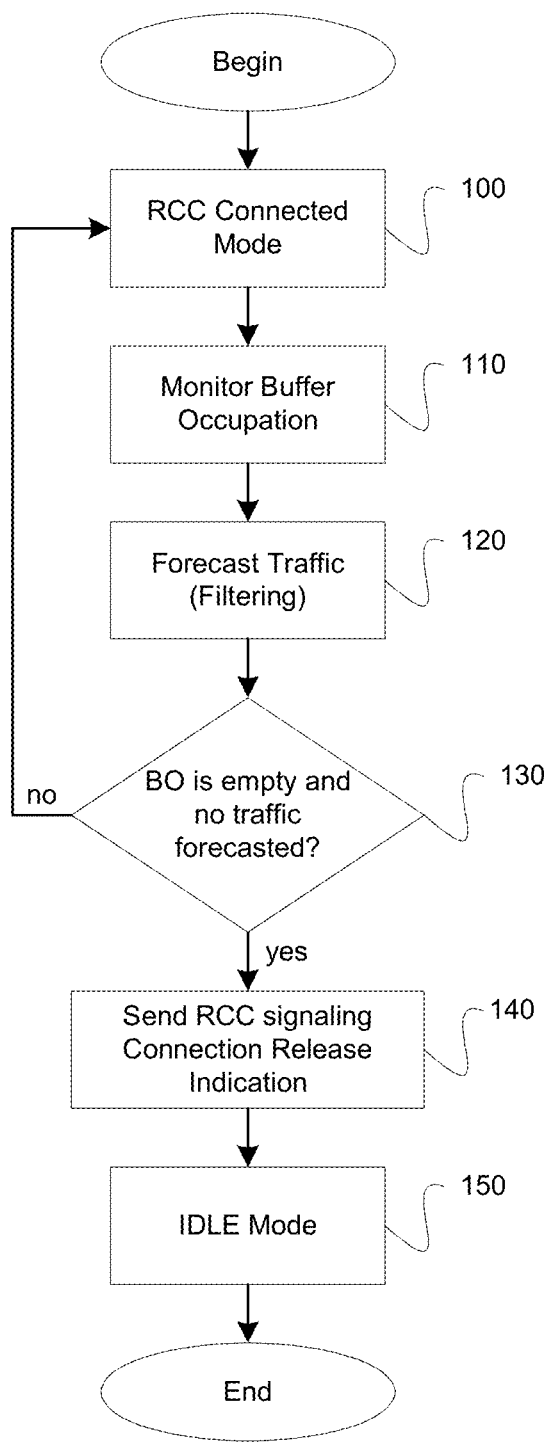
FIG. 3 a general flowchart for the method of the present invention.

FIG. 3 shows a general view of the method for managing mobile radio resources for package receiving enhancement. Once the mobile device is in the RRC connected state (100), it begins monitoring the buffer (BO) (110). During such monitoring, besides the state of stacking data packets, the rate, in which data packets are coming, is also checked. With this data, it is possible to create an arrival profile for data packets as a function of time. Based on such profile, it is carried out the operation of traffic prediction (120). There is state of the art several classic algorithms that perform this operation. Data traffic prediction can be performed using any of prediction model available, not limited to one or other method. Examples of filtering method are the Neural Networks, as described by Okutani, I. and Y. Stephanedes, entitled: Dynamic Prediction of Traffic Volume through Kalman Filtering Theory. In Transportation Research B, Vol. 18B, No. 1, pp 1-11, 1984; B. L. Smith, M. J. Demetsky, "Short-term traffic flow prediction: Neural network approach", in Transportation Research Record No. 1453, Intelligent Transportation Systems: Evaluation, Driver Behavior, and Artificial Intelligence, 98-104, 1994, as well as L. Li, W.-H. Lin, H. Liu, "Type-2 fuzzy logic approach for short-term traffic forecasting", in Intelligent Transport Systems, IEE Proceedings Vol. 153, 33-40, 2006. According to the preferred embodiment of the present invention, Kalman filters were used. Further to that, it is checked if the BO (110) is empty and whether the predicted traffic is also zero (130). If both answers are positive, it sends an interrupt signal to a specific point of the RRC state machine, in which it is requested that the normal flow is diverted and the signaling of disconnection from the mobile device (140) is generated. At the end of the process, it enters the Idle mode (150).

ADVANTAGES OF THE INVENTION

The present invention provides the following advantages over the prior art:
- It saves up to 20% in battery power consumption (for the already tested scenarios);
- It avoids successive reconnection of the radio resource (RRC) causing the user to have higher performance while using data applications, because it makes more efficient handling of timeouts in accordance with the specific traffic characteristics of each user. Currently, the times T1 and T2 are set by the network and are fixed for all users connected to the same, which can be good for a group of users, but not for all users.
- The solution is made using the device side without the need for changes in 3GPP standards or in the network core; and
- It prevents the excessive consumption of power for any type of IP packet traffic, such as e-mail, keep-alive messages, "unwanted packages", web traffic, etc.

Maintaining the radio resource active during a long period of time is a solution for the operator to save network resources. Consequently, new radio links are avoided if multiple packets are sent in a short period of time. On the other hand, the mobile device is damaged, because it must be maintained in this state consuming unnecessary power even though no information is being received.

This problem should be treated more carefully, since it is present in the receipt of any package, whether requested or not. Since the disconnection timeouts are configured at the side of the network of the operator, and not at the device, it should be used an alternative solution so that the radio resources do not remain active for long periods of time, and turn them off when they are not needed. The 3GPP standard establishes a way for the RRC disconnection to be required by the device when it senses inactivity, and thus, avoiding excessive consumption of energy. This procedure causes extra signaling of a message more than if disconnection came from operator.

Figure 4:
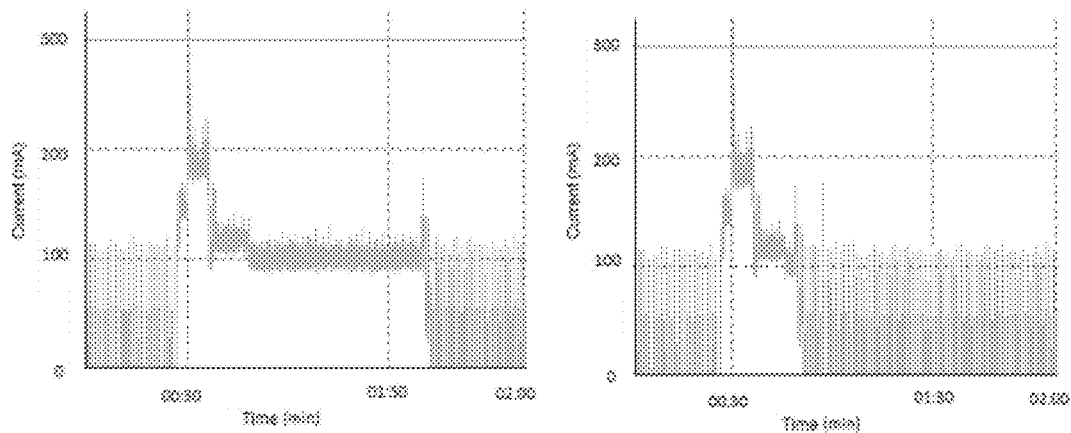
FIG. 4 depicts the consumption generated by receiving a packet for a Cell_FACH timeout of a) 30 seconds (network) and b) 5 second (mobile phone).

FIG. 4 illustrates the consumption generated by each RRC state for cases where the Cell_FACH network timeout is kept unchanged at 30 seconds and for the case where this time is reduced to 5 seconds, having disconnection originated from the mobile phone. By shortening the interval, consumption becomes 1.199 mAh, for 482.56 uAh, generating a consumption reduction of 59.7%.

The power consumption will be lower as lower the downtime attributed to Cell_FACH is. Although this solution is efficient in terms of reducing consumption, some problems may occur such as:
- Decreasing performance for data access;
- Increasing signaling messages.

The performance decrease is linked to user accessibility. If the timeout is too short, and a new request for accessing an Internet content (such as a Web page, for example) is performed after the disconnection of the RRC, the answer will take longer due to extra time of new establishment of a RRC connection to be made. Consequently, there is an increased number of signaling between the device and the network to establish this new connection, which would not occur for a timeout a little longer. Another type of extra signaling is generated from the disconnect request message by the device.

Figure 5:
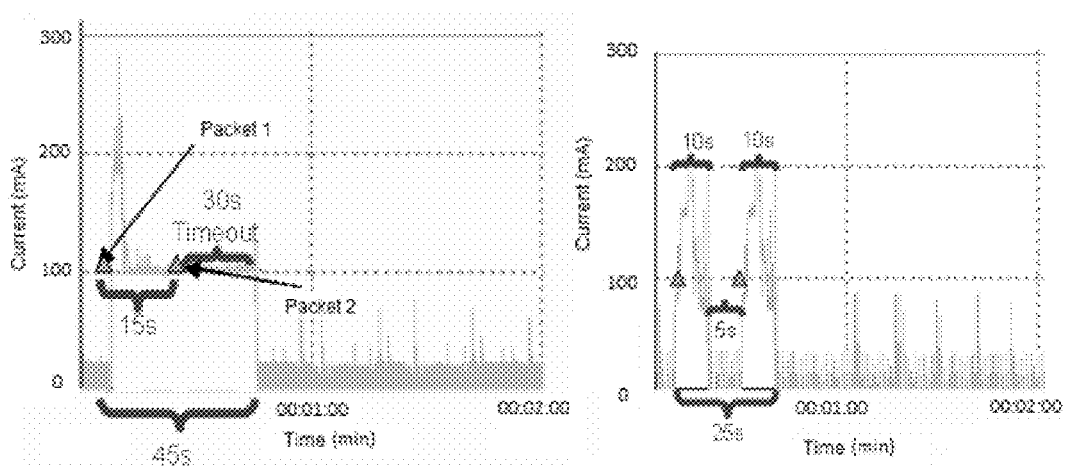
FIG. 5 depicts the consumption generated by receiving two packets in a interval of 15 second for a Cell_FACH timeout of a) 30 seconds (network) and b) 5 second (mobile phone).

FIG. 5 illustrates the receipt of two packets with an interval of 15 seconds between them. In (a), it is showed a Cell_FACH timeout set to 30 seconds (network), and in (b) 5 seconds (device).

For the largest timeout value, after 15 seconds of receiving the first package, the FACH channel is still active (active connection in RRC), and the packet is received without the need for a new connection. A new timeout of 30 seconds after receiving the second packet is then started, causing the transaction to receive the two packets to take 45 seconds, consuming 1.446 mAh (5.35 MWh).

The example of FIG. 5 shows that setting a low value of T2 does not necessarily guarantee energy savings. To minimize this problem, the present invention proposes that the timeout time is controlled by the mobile device dynamically. According to the preferred embodiment of the present invention, the timeout time will be generated according to the profile of data traffic that is occurring on the network at that time.

To explain how this data profile is acquired and how the signaling that comes from the mobile device are generated, first the standard process will be presented, implemented in mobile devices of the 3GPP standard of the RRC state machine. Then, on this standard process, new functional blocks that implement the object of the present invention will be presented.

Device which Runs the State Machine of the Invention

Figure 6:
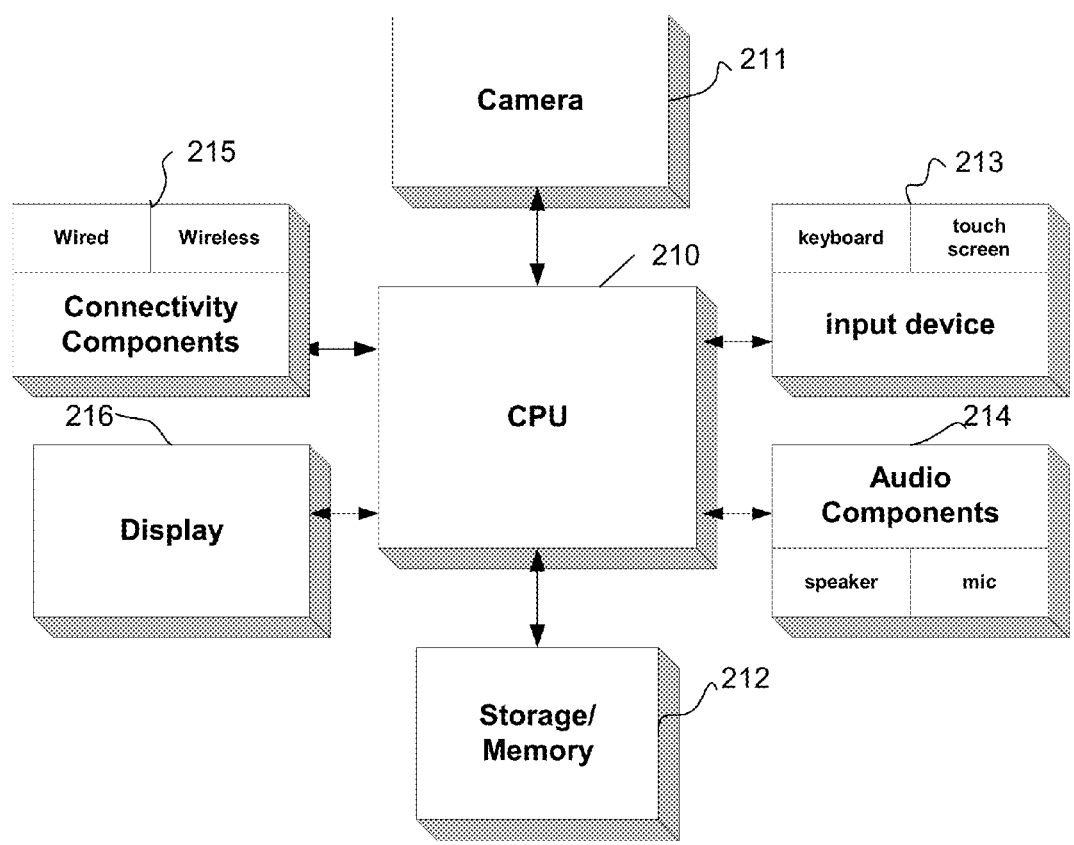
FIG. 6 shows a RRC standard state machine.

The hardware needed to carry out the method of the present invention is a portable device, in which its main features are illustrated in FIG. 6. The CPU (210) (Central Processing Unit) is responsible for interpreting and executing the instructions defined in the RRC state machine that implements the method of the present invention. The camera (211) is responsible for capturing the images. The storage medium (212) serves to store information and data, including historical data profile from the network, among others. The hardware also consists of information input devices (213) and audio components (214). Through these connectivity component (215), it is possible to send/receive data traffic and information between the mobile device and the network, including its signaling and connection and disconnection parameter setting. The exhibition means (216) is used to view the pictures captured by the camera device.

Figure 7:
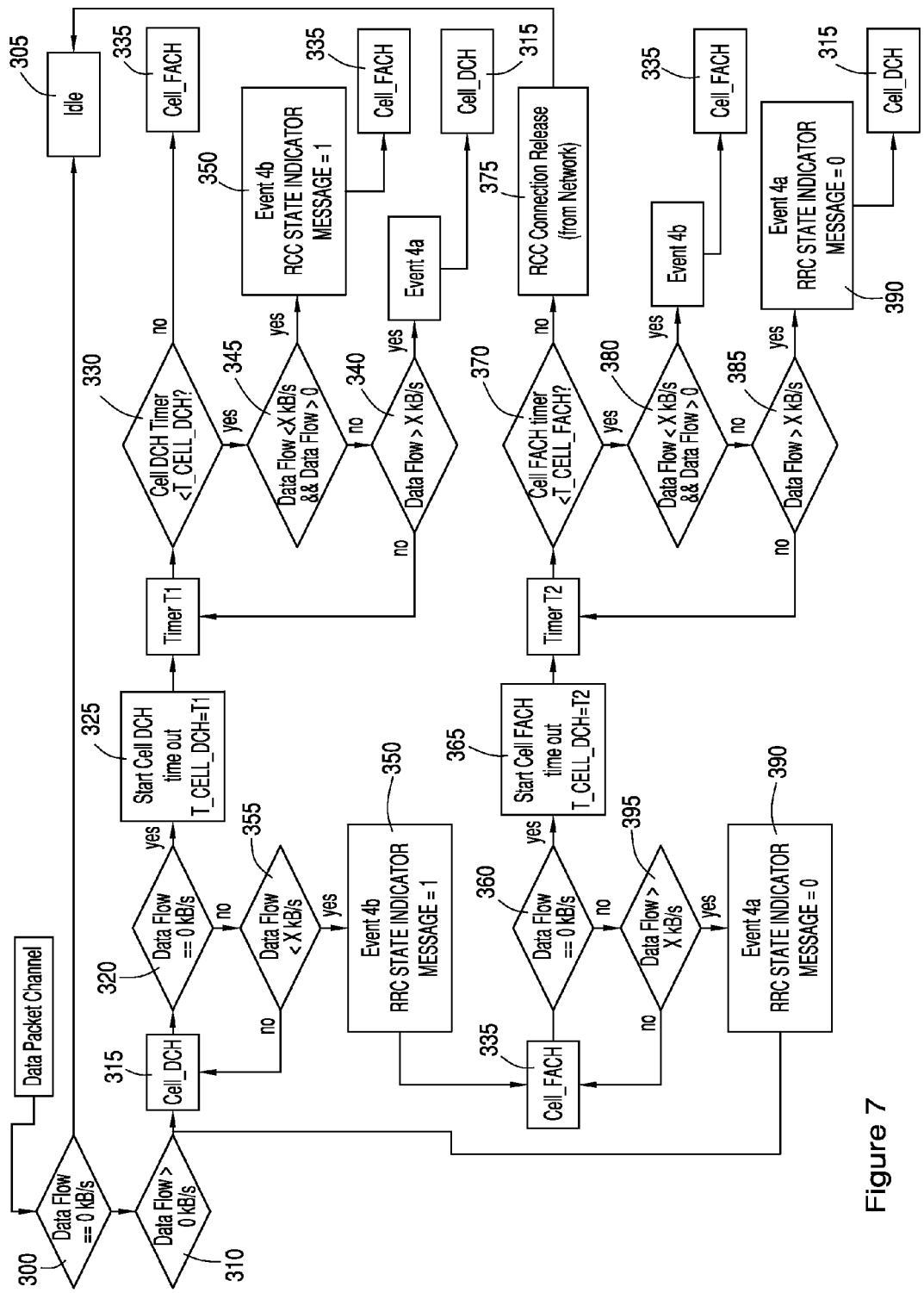
FIG. 7 shows a standard state machine implemented in 3GPP standard.

FIG. 7 shows the standard state machine implemented in 3GPP standard. This state machine is limited to states Cell_FACH, Cell_DCH (RRC Connected) and Idle only because the higher consumption is related to this case.

The Data Packet Channel block represents the flow of packets from the network and that are received by the mobile device.

If there is no data flow (300), the mobile device remains in Idle state (305). If the flow is greater than 0 (310), the mobile device goes to the Cell_DCH (315) state to traffic data. Once in this state, two possibilities are available: Cell_DCH (315) or Cell_FACH (335).

Cell_DCH (315)

If the mobile device has finished receiving the packets and data flow is reset (320), a timer having value T1 seconds is started (325). If no data flows until timeout overflow (330), the mobile device will follow the flow of the state machine to Cell_FACH (335).

If any data is being sent during the timeout, the phone can continue in the Cell_DCH state (315) or Cell_FACH state (335), depending on the amount of packets that are arriving at the device. If it is greater than the threshold (XKB/s) (340), the device remains in Cell_DCH state (315), otherwise, it sends the event 4b (350) to the network, which detects the traffic change and sends to the phone the Message RRC State Indicator=1, causing the mobile device to change to Cell_FACH state (335).

If the mobile device is in Cell_DCH state, but the traffic volume is less than the threshold (355), the phone sends the event 4b (350) to the network warning that the traffic volume is below the threshold and the network sends the message RRC State Indicator=1, causing the phone switch to the Cell_FACH state (335).

Cell_FACH (335):

If the mobile device has finished receiving the packages and/or data flow is zero (360), a timer having a value T2 seconds is started (365). If no data flows until timeout overflow (370), the phone will receive from the network the message RRC Connection Release (375), which means that the disconnection of the RRC will be undone. Other cases may still occur, but as in terms of energy consumption, such states that are similar to the state Idle, the flowchart has been simplified.

If any data is sent during the timeout, the mobile device can continue in Cell_DCH state (315) or Cell_FACH state (335), depending on the amount of packets that are arriving ar\t the phone. If less than the threshold (XKB/) (380), the device remains in Cell_FACH state (335), otherwise, it sends the event 4a (390) to the network, which detects the traffic change and sends back to the device the message RRC State Indicator=0, causing the same to change to the Cell_DCH (315) state.

If the mobile device is Cell_FACH, but the traffic volume is greater than the threshold (395), the device sends the event 4a (390) to the network warning that the traffic volume is above the threshold and the network sends the RRC State Indicator=1, causing the same to change to the Cell_DCH state (315).

Figure 8:
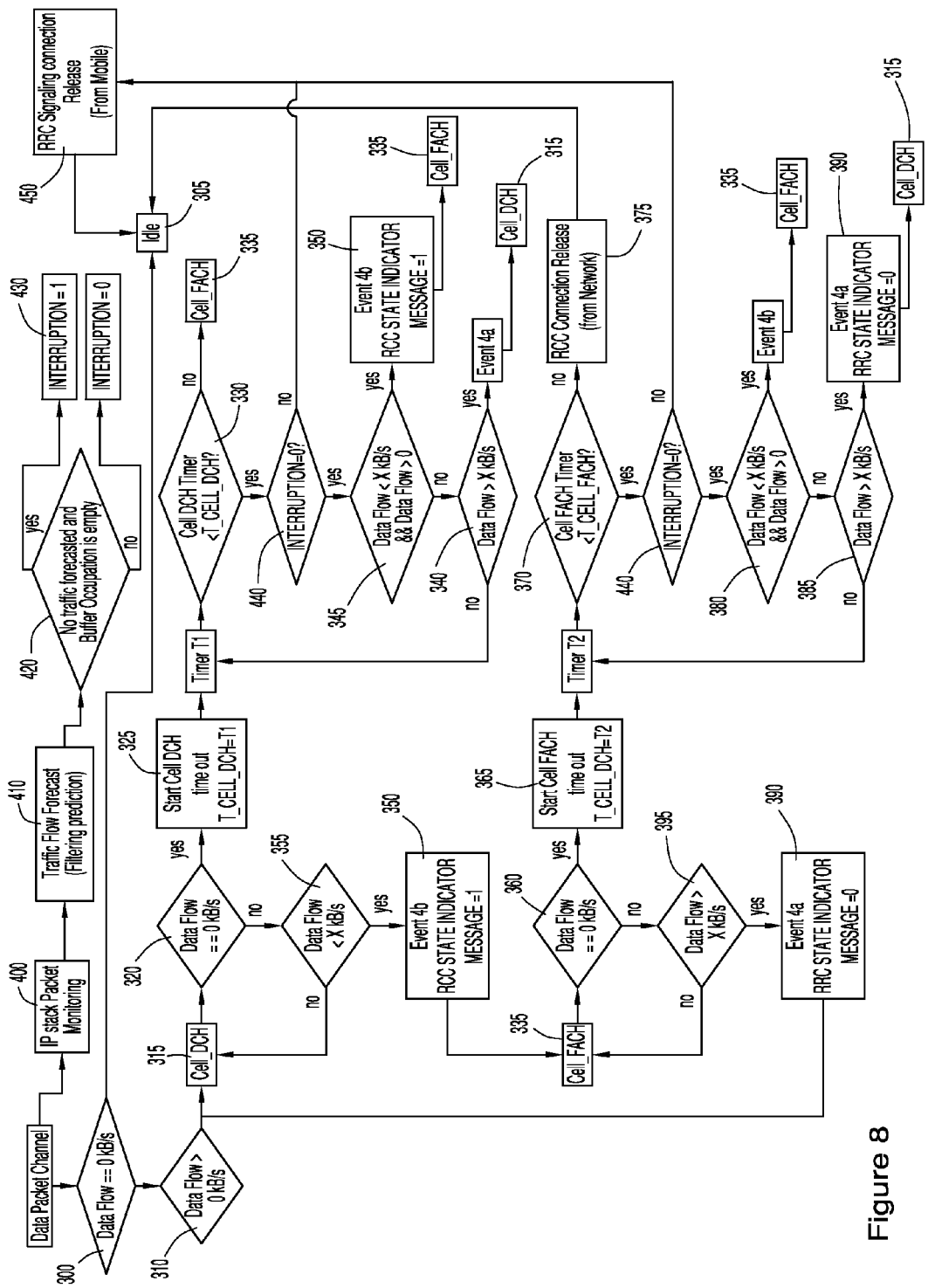
FIG. 8 shows the method according to the present invention.

The method according to the present invention as shown in FIG. 8 in gray, comprising a mobile device monitoring the TCP/IP stack of packets received during a given interval and by a historical data series and a prediction mechanism (such as Kalman filter, neural networks, etc.) to predict the amount of packets that will be in the buffer (Buffer Occupation—BO) in the next instants (400) and (410).

If traffic is expected in the next moment to be zero and there is no packets in the buffer (data currently being received) (420), a break "flag" will be set (430). As a result, the timeout timers existing in the standard state machine will be terminated (440) and the device will prompt a RRC disconnection through the message RRC SIGNALLING RELEASE INDICATION (450), then avoiding the extra consumption generated by T1 and T2 timeouts.

The predicted result is not always 0 for no traffic, but a value near to zero. Due to this situation, a threshold should be considered to decide if the predicted value is considered that there would have or not data traffic in the next period of time. This threshold value will depend of the filtering method accuracy, and can be tuned in different ways, according to each mobile manufacturer.

Thus, air features will be used more efficiently. Once predicted that there will be traffic to be received in the next moment, the mobile device will remain in CEll_DCH state or Cell_FACH state, preventing further delays and reconnections to the user (improved performance).

Figure 9:
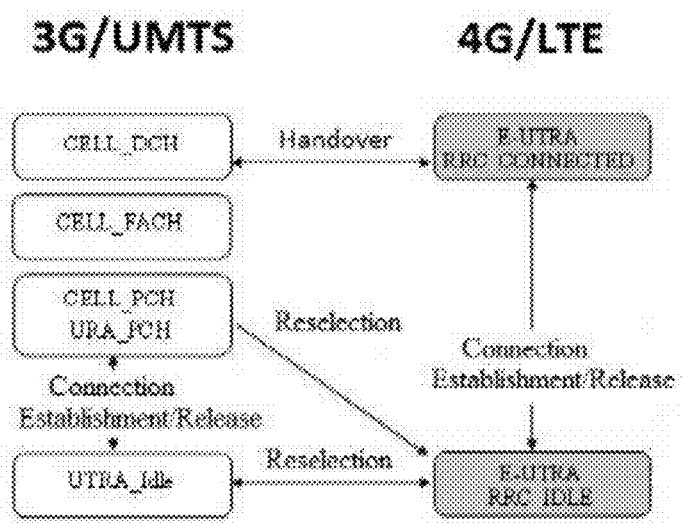
FIG. 9 shows similarities of 3G and 4G RCC, as the method of the present invention can only be employed in 4G system.

Similar procedure can be performed for 4G RRC state machine, once the procedure is similar to 3G, but in 4G Cell_FACH state is not present, and mobile can switch from Connected to Not-Connected mode only, as shown in FIG. 9.

The efficiency of this method will depend on the quality of the filter used to predict the traffic received by the device. Based on real network data and using the predictor based on Kalman filter, simulations were made as follows:

Traffic A: Prediction made taking into account a network with $T1=5$ s and $T2=30$ s.

Traffic B: Prediction made taking into account a network with $T1=5$ s and $T2=5$ s.

The results obtained for different times of day and the total time of observation are showed in table 1 below.

TABLE 1

| Gain in the decrease of maximum consumption relating non-use of predictor (%) | | |
|---|---|---|
| Period of time | traffic A | traffic B |
| Total | 18.52 | 14.54 |
| 12 a.m. until 4 a.m. | 7.54 | 12.60 |
| 4 a.m. until 8 a.m. | 5.63 | 12.67 |
| 8 a.m. until 12 p.m. | 15.01 | 13.63 |
| 12 p.m. until 16 p.m. | 13.48 | 16.72 |
| 20 p.m. until 12 a.m. | 16.93 | 12.21 |

Although a preferred embodiment of the present invention is shown and described, those skilled in the technical will understand that various modifications can be made without departing from the spirit and scope of the present invention, as defined in the appended claims.

It is also expressly stated that all combinations of elements that perform the same function in substantially the same way to achieve the same results are within the scope of the present invention.

The invention claimed is:

1. A method for managing mobile radio resources, the method comprising:
   monitoring a buffer occupation when a mobile device is in a Radio Resource Control (RRC) connected state;
   stacking data packets;
   checking a rate in which the data packets are received;
   creating an arrival profile, using the checked rate, for the data packets as a function of time;
   predicting traffic based on the created arrival profile;
   checking if the buffer occupation is empty and whether the predicted traffic is zero; and
   if the buffer occupation is empty and the predicted traffic is zero, sending an interrupt signal to a specific point of the RRC,
   wherein the interrupt signal comprises a request to divert the data packets, disconnect from the mobile device, and for the device to enter an RRC Idle state.

2. The method of claim 1, wherein successive reconnection of the RRC is avoided causing a user to have higher performance while using data applications, making more efficient handling of timeouts in accordance with specific traffic characteristics of each user.

3. The method of claim 1, wherein no changes in 3GPP standards or in a network core are needed.

4. The method of claim 1, wherein excessive power consumption of any type of data packet traffic receiving is prevented.

5. The method of claim 1, wherein, if the traffic is immediately expected to be zero and there are no packets in the buffer, a break flag will be set, resulting in timeout timers in the RRC being terminated and the device prompting a RRC disconnection through a message RRC SIGNALLING RELEASE INDICATION, which avoids extra consumption generated by timer 1 and timer 2.

6. The method of claim 1, wherein, if it is predicted that there will be traffic to be received immediately, the mobile device will remain in a Cell Dedicated Channel (Cell_DCH) state or a Cell Forward Access Channel (Cell_FACH) state, preventing further delays and reconnections to a user.

7. The method of claim 1, wherein a threshold can be included to be checked together with a prevision model, said threshold being applied to each RRC state, and according to this verification, said device can decide whether to change state or not.

8. The method of claim 1, wherein said state change can be used in a dynamic way by each user or a fixed way.

9. The method of claim 1, wherein said state change can also be adapted according to a desired use.

10. The method of claim 1, wherein it uses extended for 4G RRC state machine.

11. The method of claim 1, wherein packet receiving control is employed to detect a change between the connected state and the idle RRC state.

\* \* \* \* \*

UNITED STATES PATENT AND TRADEMARK OFFICE
CERTIFICATE OF CORRECTION

| | | |
|---|---|---|
| PATENT NO. | : 8,804,541 B2 | Page 1 of 1 |
| APPLICATION NO. | : 13/278495 | |
| DATED | : August 12, 2014 | |
| INVENTOR(S) | : Tito Ricardo Bianchin Oliveira | |

It is certified that error appears in the above-identified patent and that said Letters Patent is hereby corrected as shown below:

In the Claims

Column 9, Line 7, In Claim 5, Delete "timer 2." and insert -- timer 2 timeouts. --, therefor.

Signed and Sealed this
Seventh Day of April, 2015

Michelle K. Lee
*Director of the United States Patent and Trademark Office*